United States Patent
Kwon et al.

(10) Patent No.: US 12,536,897 B2
(45) Date of Patent: Jan. 27, 2026

(54) METHOD AND APPARATUS FOR DETERMINING VEHICLE BEHAVIOR FOR BOTTLENECK CONGESTION CONTROL

(71) Applicant: FOUNDATION OF SOONGSIL UNIVERSITY-INDUSTRY COOPERATION, Seoul (KR)

(72) Inventors: Min Hae Kwon, Seoul (KR); Chan In Eom, Seoul (KR); Dong Su Lee, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 306 days.

(21) Appl. No.: 18/219,628

(22) Filed: Jul. 7, 2023

(65) Prior Publication Data

US 2024/0242596 A1 Jul. 18, 2024

(30) Foreign Application Priority Data

Jan. 17, 2023 (KR) .................. 10-2023-0006745

(51) Int. Cl.
G08G 1/01 (2006.01)
G08G 1/0967 (2006.01)

(52) U.S. Cl.
CPC ..... *G08G 1/0116* (2013.01); *G08G 1/096725* (2013.01)

(58) Field of Classification Search
CPC ... B60W 30/18163; G06N 20/00; G06N 3/08; H04W 4/44; H04W 4/46
See application file for complete search history.

(56) References Cited

U.S. PATENT DOCUMENTS

2021/0201051 A1* 7/2021 Deselaers ....... B60W 30/18163
2021/0316753 A1 10/2021 Zhao
(Continued)

FOREIGN PATENT DOCUMENTS

CN 112700642 A * 4/2021
CN 115285147 A 11/2022
(Continued)

OTHER PUBLICATIONS

T. Shi, P. Wang, X. Cheng, C. -Y. Chan and D. Huang, "Driving Decision and Control for Automated Lane Change Behavior based on Deep Reinforcement Learning," 2019 IEEE Intelligent Transportation Systems Conference (ITSC), Auckland, New Zealand, 2019, pp. 2895-2900, doi: 10.1109/ITSC.2019.8917392. (Year: 2019).*
(Continued)

*Primary Examiner* — Fadey S. Jabr
*Assistant Examiner* — Mario C Gonzalez
(74) *Attorney, Agent, or Firm* — Bridgeway IP Law Group, PLLC; Sang Ho Lee; Hyun Woo Shin

(57) ABSTRACT

Provided is a method and an apparatus for determining a vehicle behavior, and more specifically, to a method and an apparatus for determining a vehicle behavior for bottleneck congestion control in a bottleneck section. Tn apparatus for determining a vehicle behavior may include an information collection unit collecting surrounding information of a target driving vehicle from a road side unit (RSU), a vehicle observation unit obtaining observation information based on the target driving vehicle from a sensing module mounted on the target driving vehicle, a reward determination unit determining a reward for the target driving vehicle through a reward function which uses the surrounding information and the observation information, a model training unit updating and training a decision making model through the reward, and a behavior determination unit determining a
(Continued)

behavior of the target driving vehicle by inputting the observation information into the decision making model.

20 Claims, 7 Drawing Sheets

(56) References Cited

U.S. PATENT DOCUMENTS

| | | | |
|---|---|---|---|
| 2022/0126864 A1* | 4/2022 | Moustafa | G06T 9/00 |
| 2023/0035281 A1* | 2/2023 | Reshef | B60W 60/0061 |

FOREIGN PATENT DOCUMENTS

| | | |
|---|---|---|
| CN | 115402319 A | 11/2022 |
| KR | 10-2018-0095225 A | 8/2018 |
| KR | 10-2020-0119389 A | 10/2020 |
| KR | 10-2021-0044963 A | 4/2021 |
| KR | 10-2022-0167730 A | 12/2022 |

OTHER PUBLICATIONS

B. Brito, A. Agarwal and J. Alonso-Mora, "Learning Interaction-Aware Guidance for Trajectory Optimization in Dense Traffic Scenarios," in IEEE Transactions on Intelligent Transportation Systems, vol. 23, No. 10, pp. 18808-18821, Oct. 2022, doi: 10.1109/TITS.2022.3160936. (Year: 2022).*

Chanin Eom et al., "TD3-based Autonomous Driving Strategy for Bottleneck Traffic", The 3rd Korea Artificial Intelligence Conference, Sep. 2022.

Dongsu Lee et al., "ADAS-RL: Safety learning approach for stable autonomous driving", ICT Express 8 (2022) 479-483. May 14, 2022.

Dongsu Lee et al., "Stability Analysis in Mixed-autonomous Traffic with Deep Reinforcement Learning", IEEE Transactions on Vehicular Technology, Oct. 19, 2022, pp. 1-16.

* cited by examiner

| | NON-RL VEHICLE | RL VEHICLE | |
|---|---|---|---|
| ALL SECTIONS | 5.77 m/s | 6.31 m/s | ▲ 0.54 |
| BOTTLENECK SECTION | 4.79 m/s | 5.32 m/s | ▲ 0.53 |

METHOD AND APPARATUS FOR DETERMINING VEHICLE BEHAVIOR FOR BOTTLENECK CONGESTION CONTROL

CROSS-REFERENCE TO RELATED APPLICATIONS

This application claims the priority of Korean Patent Application No. 10-2023-0006745 filed on Jan. 17, 2023, in the Korean Intellectual Property Office, the disclosure of which is incorporated herein by reference.

STATEMENT REGARDING PRIOR DISCLOSURES BY THE INVENTOR OR A JOINT INVENTOR

The three non-patent literature references submitted herewith in an information disclosure statement pursuant to 37 CFR § 1.97 are prior disclosures by the joint inventors made 1 year or less before the effective filing date of the instant application, and thus, are not prior art to the instant application as exceptions under 35 USC § 102(b)(1).

BACKGROUND

Field

The present disclosure relates to a method and an apparatus for determining a vehicle behavior, and more specifically, to a method and an apparatus for determining a vehicle behavior for bottleneck congestion control in a bottleneck section.

Description of the Related Art

Recently, as autonomous driving system research has accelerated, review of a decision-making ability in various road environments of autonomous vehicles has been conducted. However, related technologies are being actively studied in many road environments such as straight roads, intersections, and round roads, but it is difficult to find a system considering a traffic congestion caused by a bottleneck section.

In the bottleneck section, a risk factor that is difficult to predict, such as a sudden stop due to the density of the vehicle, may occur at all times, and it is difficult to predict on which lane the congestion will occur.

An autonomous system considering such a bottleneck road environment may increase a driving stability in an actual road having many uncertain elements.

As a related art thereto, there is Korean Patent Unexamined Publication No. 10-2021-0044963.

However, the related art is not a method related to a determining for determining the vehicle behavior in the bottleneck section, but just describes to set only a lane change route, so the related art does not disclose an optimal vehicle behavior determining method for the bottleneck congestion control.

Therefore, there is a need for a technology that may determine the optimal vehicle behavior in the bottleneck section. In addition, a technology for determining the vehicle behavior considering vehicle acceleration control which is directly required for vehicle control as well as lane change is also needed.

SUMMARY

An object of the present disclosure is to provide a method and an apparatus for determining a vehicle behavior, in which a target driving vehicle may drive close to a target speed using a reward function including various reward terms, but also minimize a speed decrease in a congestion section through by changing a lane.

The objects of the present disclosure are not limited to the above-mentioned objects, and other objects and advantages of the present disclosure that are not mentioned may be understood by the following description, and will be more clearly understood by exemplary embodiments of the present disclosure. Further, it will be readily appreciated that the objects and advantages of the present disclosure may be realized by means and combinations thereof shown in the claims.

According to an aspect of the present disclosure, an apparatus for determining a vehicle behavior includes: an information collection unit collecting surrounding information of a target driving vehicle from a road side unit (RSU); a vehicle observation unit obtaining observation information based on the target driving vehicle from a sensing module mounted on the target driving vehicle; a reward determination unit determining a reward for the target driving vehicle through a reward function which uses the surrounding information and the observation information; a model training unit updating and training a decision making model through the reward; and a behavior determination unit determining a behavior of the target driving vehicle by inputting the observation information into the decision making model.

Further, in one exemplary embodiment of the present disclosure, the reward determination unit includes an internal reward determination unit determining an internal reward using the observation information and an external reward determination unit determining an external reward using the surrounding information.

Further, in one exemplary embodiment of the present disclosure, the reward function is expressed by Equation 3 below.

$$R_t = \eta_1 R_{t,1} + \eta_2 R_{t,2} + \eta_3 R_{t,3} + \eta_4 R_{t,4} \qquad \text{[Equation 3]}$$

Here, $R_t$ represents a total reward, $R_{t,1}$ represents a target speed compliance reward/penalty term, $R_{t,2}$ represents a successful lane change reward/penalty term, $R_{t,3}$ represents an unsafe following distance penalty term, and $R_{t,4}$ represents an infeasible behavior penalty term. $\eta$ which is multiplied to each reward term may mean a weight of each reward term, and $\eta$ may be defined by any positive real number including 0. For example, in the case of $\eta_1=0$, the reward determination unit 130 may not consider the target speed compliance reward/penalty term.

In addition, in one exemplary embodiment of the present disclosure, the target speed compliance reward/penalty term is calculated by Equation 4 below.

$$R_{t,1} = \begin{cases} \dfrac{v_{t+1,N}}{v^*} & v_{t+1,N} \leq v^* \\ \dfrac{v_{limit} - v_{t+1,N}}{v_{limit} - v^*} & v_{t+1,N} > v^* \end{cases} \qquad \text{[Equation 4]}$$

Here, $R_{t,1}$ represents the target speed compliance reward/penalty term, which is the internal reward, $v^*$ represents the target speed of the target driving vehicle, and $v_{limit}$ represents a speed limit, respectively.

In addition, in one exemplary embodiment of the present disclosure, the successful lane change reward/penalty term is calculated by Equation 5 below.

$$R_{t,2} = |a_{t,lc}|(\Delta p_{t+1,l} - \Delta p_{t,l} - \delta_{lc}) \quad \text{[Equation 5]}$$

Here, $R_{t,2}$ represents the successful lane change reward/penalty term, which is the external reward, $\Delta p_{t+1,l}$ represents a relative distance from the following vehicle on the same lane after changing lanes, $\Delta p_{t,l}$ represents a relative distance from the leading vehicle on the same lane before the lane change, $\delta_{lc}$ represents a threshold determining successful lane change, respectively, and $|a_{t,lc}|$ represents whether the target driving vehicle performs the lane change.

In addition, in one exemplary embodiment of the present disclosure, the unsafe following distance penalty term is calculated by Equation 6 below.

$$R_{t,3} = |a_{t,lc}| \times \min\left[0, 1 - \left(\frac{s^*}{\Delta p_{t+1,f}}\right)^2\right] \quad \text{[Equation 6]}$$

Here, $R_{t,3}$ represents the unsafe following distance penalty term, which is the external reward, $\Delta p_{t+1,f}$ represents a relative distance from the following vehicle on the same lane after changing lanes, s* represents a safety distance from the following vehicle on the same lane, and $|a_{t,lc}|$ represents whether the target driving vehicle performs the lane change.

In addition, in one exemplary embodiment of the present disclosure, an infeasible behavior penalty term is calculated by the sum of an infeasible acceleration control term and an infeasible lane change term.

In addition, in one exemplary embodiment of the present disclosure, the surrounding information includes speed and location information of a leading/following vehicle positioned on the same lane as the target driving vehicle.

In addition, in one exemplary embodiment of the present disclosure, the observation information includes at least one of, based on the target driving vehicle, a relative speed of a leading/following vehicle for each lane, a relative distance from the leading/following vehicle for each lane, a vehicle density for each front lane, a number of lanes on the road after an effective observation distance, an absolute speed of the target driving vehicle, an absolute location of the target driving vehicle, a lane number where the target driving vehicle is positioned, and a total number of lanes on the road where the target driving vehicle is positioned.

In another aspect of the present disclosure, a method for determining a vehicle behavior includes: collecting, by an information collection unit, surrounding information of a target driving vehicle from a road side unit (RSU); obtaining, by a vehicle observation unit, observation information based on the target driving vehicle from a sensing module mounted on the target driving vehicle; determining, by a reward determination unit, a reward of the target driving vehicle through a reward function using the surrounding information and the observation information; updating and training, by a model training unit, a decision making model through the reward; and determining, by a behavior determination unit, a behavior of the target driving vehicle by inputting the observation information into the decision making model.

According to an exemplary embodiment of the present disclosure, in a method and an apparatus for determining a vehicle behavior, a target driving vehicle may drive close to a target speed using a reward function including various reward terms, but also minimize a speed decrease in a congestion section through changing a lane.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
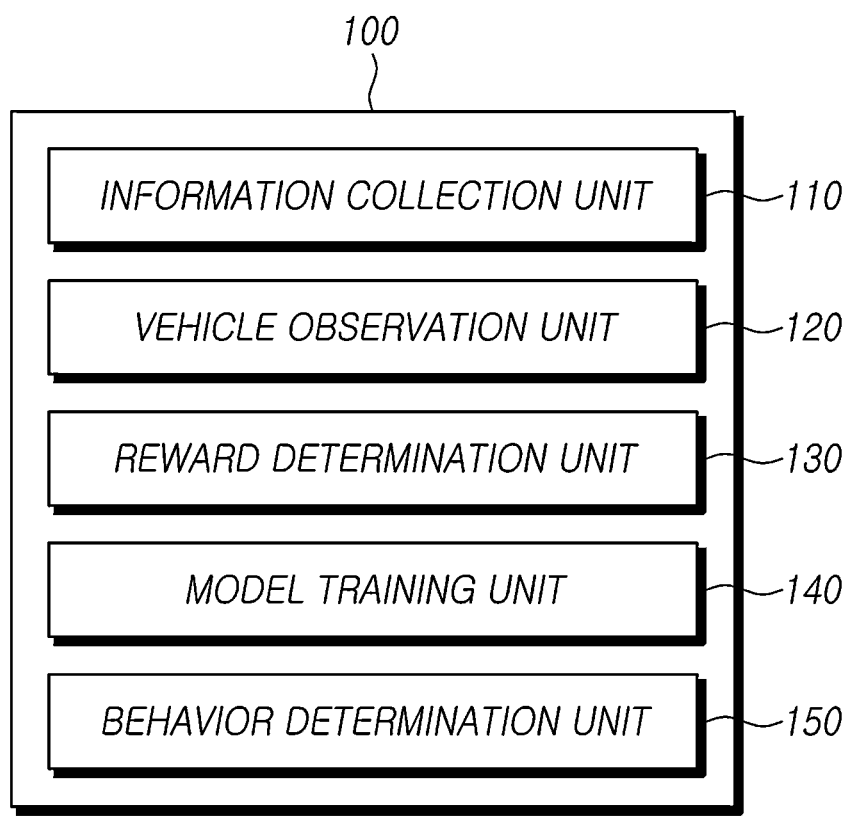
FIG. 1 is a block diagram of an apparatus for determining a vehicle behavior according to an exemplary embodiment of the present disclosure.

The present disclosure may have various modifications and various exemplary embodiments and specific exemplary embodiments will be illustrated in the drawings and described in detail in the detailed description. However, this does not limit the present disclosure to specific exemplary embodiments, and it should be understood that the present disclosure covers all the modifications, equivalents and replacements included within the idea and technical scope of the present disclosure. In describing each drawing, reference numerals refer to like elements.

Terms including as first, second, A, B, and the like are used for describing various constituent elements, but the constituent elements are not limited by the terms. The terms are used only to discriminate one constituent element from another component. The terms are used only to discriminate one constituent element from another component. A term 'and/or' includes a combination of a plurality of associated disclosed items or any item of the plurality of associated disclosed items.

It should be understood that, when it is described that a component is "connected to" or "accesses" another component, the component may be directly connected to or access the other component or a third component may be present therebetween. In contrast, when it is described that a component is "directly connected to" or "directly accesses" another component, it is understood that no element is present between the element and another element.

Terms used in the present application are used only to describe specific embodiments, and are not intended to limit the present disclosure. A singular form may include a plural form if there is no clearly opposite meaning in the context. In the present application, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

If it is not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

Hereinafter, preferred embodiments of the present disclosure will be described in detail with reference to the accompanying drawings.

FIG. 1 is a block diagram of an apparatus 100 for determining a vehicle behavior according to an exemplary embodiment of the present disclosure. Hereinafter, the apparatus for determining a vehicle behavior will be described with reference to FIG. 1.

The apparatus for determining a vehicle behavior as an apparatus for determining a behavior of a vehicle driving in a bottleneck section using a decision making model includes an information collection unit 110, a vehicle observation unit 120, a reward determination unit 130, and a behavior determination unit 150.

The information collection unit 110 collects surrounding information of a target driving vehicle from a road side unit (RSU). The target driving vehicle refers to a vehicle that is subject to action determination driving the bottleneck section, and for example, may be an autonomous vehicle.

In addition, the RSU may be constituted by a plurality of units, and information is exchanged through wired and wireless communication between the units. Each unit also communicates with the target driving vehicle, and the communication between the RSU and the driving vehicle may be performed based on vehicle-to-infrastructure (V2I) or vehicle to something (V2X) technology, but is not particularly limited thereto.

The information that may be obtained through the communication between the driving vehicle and the RSU may include speed and location information of leading/following vehicles located in the same lane as the target driving vehicle as the surrounding information and driving data of the target driving vehicle.

On the other hand, the vehicle driving on the road does not stay in one place, but moves continuously, so one RSU unit alone may not fully collect the surrounding information of the vehicle according to a communication distance limit. Therefore, the information collection unit 110 collects the surrounding information of the target driving vehicle through communication between the units.

As such, the information collection unit 110 may successfully collect the surrounding information for the leading/following vehicles located at a distance from the target driving vehicle through the communication between the RSUs. The collected surrounding information is delivered to an external reward determination unit to be described later for external reward calculation.

The vehicle observation unit 120 obtains observation information based on the target driving vehicle from a sensing module mounted on the target driving vehicle. The sensing module operates within a valid observation range, and may be a camera, Lidar sensor, etc., but is not particularly limited thereto, and may include all sensors and devices which may obtain the observation information.

In addition, the observation information may include at least one of, based on the target driving vehicle, a relative speed of a leading/following vehicle for each lane, a relative distance from the leading/following vehicle for each lane, a vehicle density for each front lane, a number of lanes on the road after an effective observation distance, an absolute speed of the target driving vehicle, an absolute location of the target driving vehicle, a lane number where the target driving vehicle is positioned, and a total number of lanes on the road where the target driving vehicle is positioned. The detailed information of each observation information will be described in detail with reference to FIGS. 2 to 4.

Figure 2:
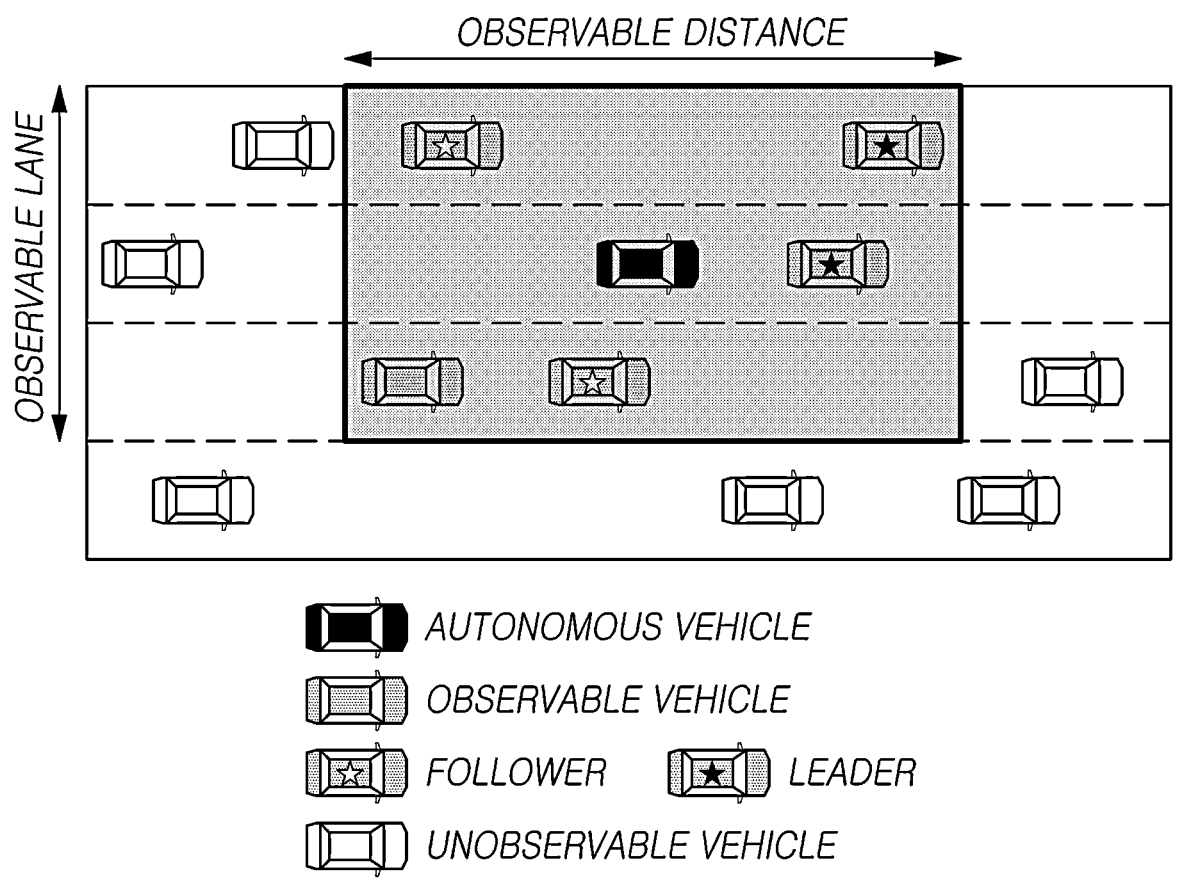
FIGS. 2 to 4 are diagrams for describing observation information in an exemplary embodiment of the present disclosure.
Figure 3:
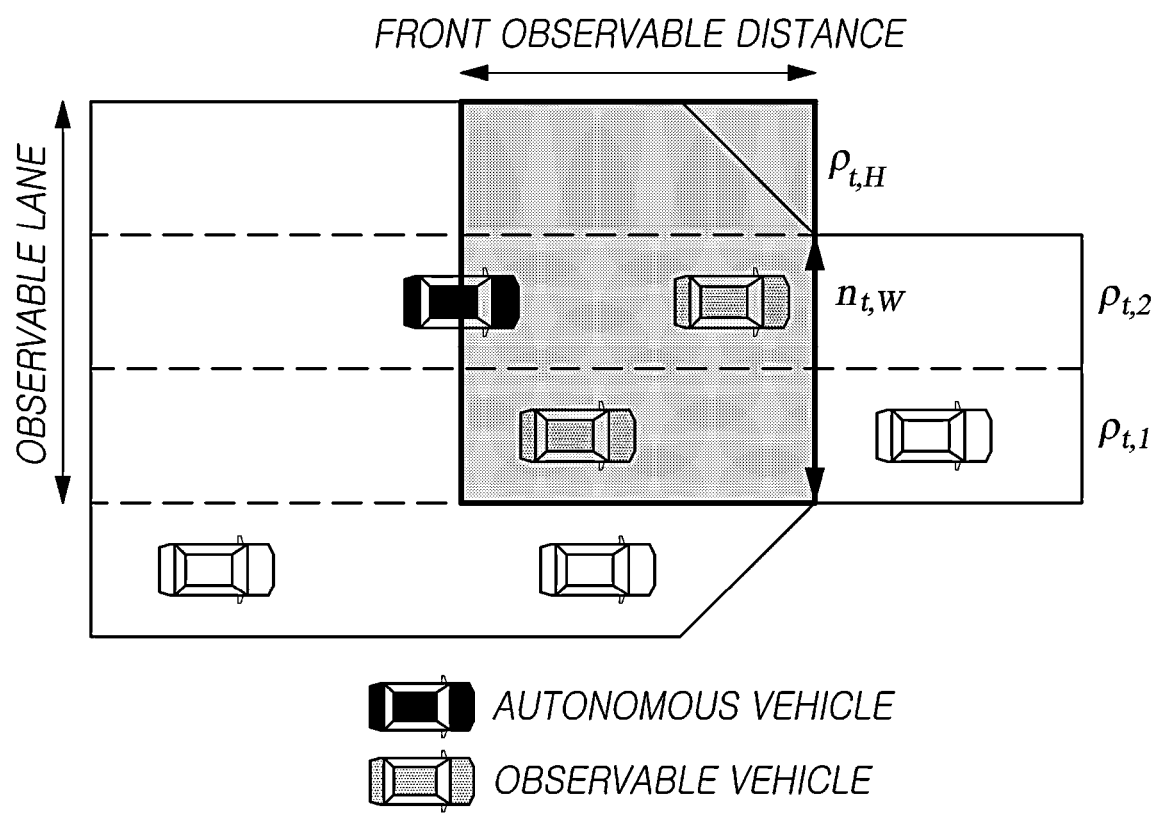
Figure 4:
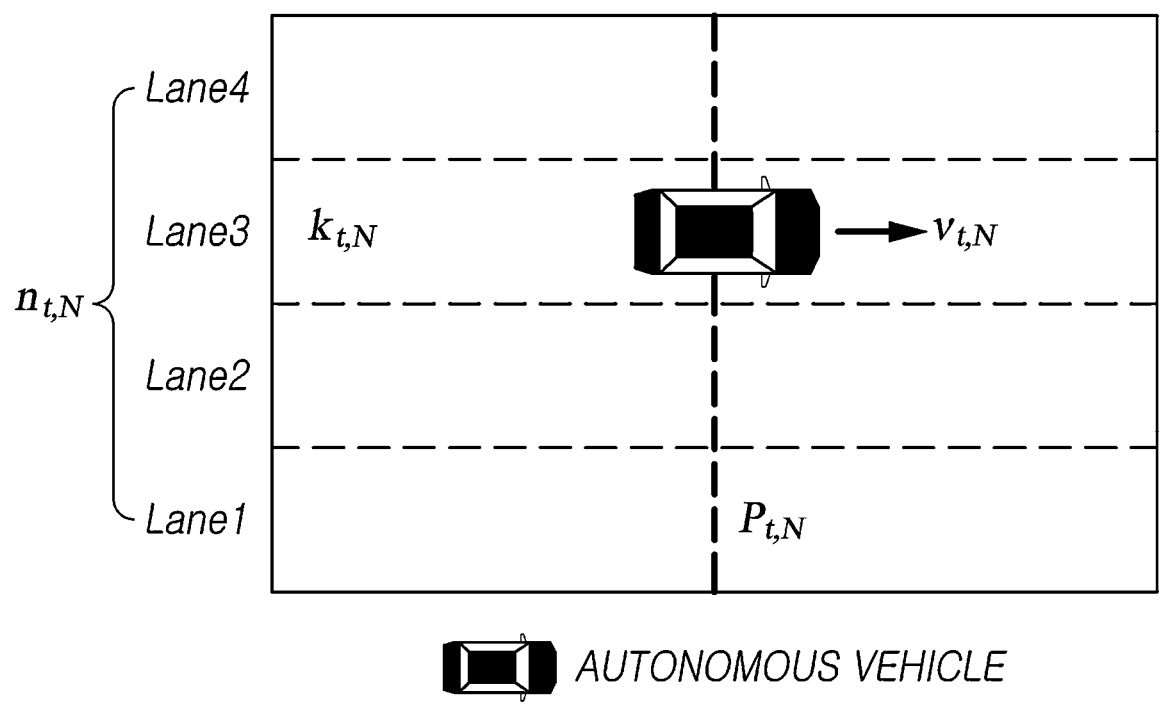

FIGS. 2 to 4 are diagrams for describing observation information in an exemplary embodiment of the present disclosure.

First, the observation information may be expressed by Equation 1 below.

$$o_t = [\Delta v_{t,lf}^T, \Delta p_{t,lf}^T, \rho_t^T, n_{t,W}, v_{t,N}, p_{t,N}, k_{t,N}, n_{t,N}]^T \quad \text{[Equation 1]}$$

Here, $o_t$ represents the observation information, $\Delta v_{t,lf}$ represents the relative speed of the leading/following vehicle for each lane, $\Delta p_{t,lf}$ represents the relative distance from the leading/following vehicle for each lane, $\rho_t^T$ represents the vehicle density for each front lane, $n_{t,W}$ represents a number of lanes on the road after an effective observation distance, $v_{t,N}$ represents the absolute speed of the target driving vehicle, $p_{t,N}$ represents the absolute location of the target driving vehicle, $k_{t,N}$ represents the lane number where the target driving vehicle is positioned, and $n_{t,N}$ represents a total number of lanes on the road where the target driving vehicle is positioned.

The sensing module operates within an observable distance and an observable lane which are effective observation ranges, and by referring to FIG. 2, a part marked with a box is the effective observation range.

Here, the vehicle observation unit 120 senses speeds and distances of the target driving vehicle, and each of the leading/following vehicle for each lane to observe $\Delta v_{t,lf}$ which is the relative speed of the leading/following vehicle for each lane and $\Delta p_{t,lf}$ which is the relative distance from the leading/following vehicle for each lane.

Referring to FIG. 3, the vehicle observation unit 120 may observe $\rho_t^T$ which is the vehicle density for each front lane and $n_{t,W}$ which is the number of lanes on the road after the effective observation distance.

In this case, a capacitance value may be calculated by Equation 2 below.

$$\rho_t = \frac{\text{Road length occupied by observed vehicle}}{W} \quad \text{[Equation 2]}$$

Here, $\rho_t^T$ represents the vehicle density for each front lane and W represents a front observable distance, and a load length occupied by the observed vehicle may be calculated by multiplying the number of vehicles for each lane and an average of observable vehicle lengths.

Referring to FIG. 4, the vehicle observation unit 120 may observe $v_{t,N}$ which is the absolute speed of the target driving vehicle, $p_{t,N}$ which is the absolute location of the target driving vehicle, $k_{t,N}$ which is the lane number where the target driving vehicle is positioned, and $n_{t,N}$ which is a total number of lanes on the road where the target vehicle is positioned. For example, referring to the figure, $k_{t,N}$ may be 3 and $n_{t,N}$ may be 4.

The reward determination unit 130 determines the reward of the target driving vehicle through the reward function using the surrounding information and the observation information. In the exemplary embodiment, although it was expressed by reward, the reward of the target driving vehicle, in a wide sense of reward, may include a reward which is a positive (+) reward and a penalty which is a negative (−) reward.

In the exemplary embodiment, the reward determination unit 130 includes an internal reward determination unit and an external reward determination unit. Specifically, the internal reward determination unit determines an internal reward using the observation information, and the external reward determination unit determines an external reward using the surrounding information.

Meanwhile, the reward function may be expressed as in Equation 3 below.

$$R_t = \eta_1 R_{t,1} + \eta_2 R_{t,2} + \eta_3 R_{t,3} + \eta_4 R_{t,4} \qquad \text{[Equation 3]}$$

Here, $R_t$ represents a reward, $R_{t,1}$ represents a target speed compliance reward/penalty term, $R_{t,2}$ represents a successful lane change reward/penalty term, $R_{t,3}$ represents an unsafe following distance penalty term, and $R_{t,4}$ represents an infeasible behavior penalty term, respectively. $\eta$ which is multiplied to each reward term means a weight of each reward term, and $\eta$ may be defined as any positive real number including 0. For example, in the case of $n_1=0$, the reward determination unit 130 may not consider the target speed compliance reward/penalty term.

That is, $R_{t,1}$ and $R_{t,4}$ represent the internal reward and $R_{t,2}$ and $R_{t,3}$ represent the external reward.

In addition, the target speed compliance reward/penalty term, $R_{t,1}$ may be calculated by Equation 4 below.

$$R_{t,1} = \begin{cases} \dfrac{v_{t+1,N}}{v^*} & v_{t+1,N} \leq v^* \\ \dfrac{v_{limit} - v_{t+1,N}}{v_{limit} - v^*} & v_{t+1,N} > v^* \end{cases} \qquad \text{[Equation 4]}$$

Here, $R_{t,1}$ represents the target speed compliance reward/penalty term, which is the internal reward, $v^*$ represents the target speed of the target driving vehicle, and $v_{limit}$ represents a speed limit, respectively.

As the target driving vehicle is driven closer to the target speed $v^*$, a largest reward is obtained and when the target driving vehicle is driven at a speed exceeding the limit speed $v_{limit}$, the negative (−) reward is obtained. In other words, the reward determination unit 130 determines the penalty for driving exceeding the limit speed, and determines the reward for driving close to the target speed.

In addition, a successful lane change reward/penalty term $R_{t,2}$ may be calculated by Equation 5 below.

$$R_{t,2} = |a_{t,lc}|(\Delta p_{t+1,l} - \Delta p_{t,l} - \delta_{lc}) \qquad \text{[Equation 5]}$$

Here, $R_{t,2}$ represents the successful lane change reward/penalty term, which is the external reward, $\Delta p_{t+1,l}$ represents a relative distance from the leading vehicle on the same lane after changing lanes, $\Delta p_{t,l}$ represents a relative distance from the leading vehicle on the same lane before the lane change, $\delta_{lc}$ represents a threshold determining successful lane change, respectively, and $|a_{t,lc}|$ represents whether the target driving vehicle performs the lane change.

$R_{t,2}$ represents a reward/penalty term applied only when the lane change (i.e., $a_{t,lc} \neq 0$) is performed, and a criterion for the successful lane change of the target driving vehicle is determined by the threshold $\delta_{lc}$. In other words, when a relative distance gain due to the lane change of the target driving vehicle is larger than $\delta_{lc}$ (i.e. $\Delta p_{t+1,l} - \Delta p_{t,l} > \delta_{lc}$), it is judged that the successful lane change is made, and as an opposite case thereto, when the relative distance gain due to the lane change of the target driving vehicle is smaller than $\delta_{lc}$, it is judged that a meaningless lane change is made.

As such, the reward determination unit 130 determines a penalty for the meaningless lane change and a reward for the successful lane change through the successful lane change reward/penalty term to weaken the meaningless lane change and strengthen the successful lane change.

In addition, the unsafe following distance penalty term, $R_{t,3}$ may be calculated by Equation 6 below.

$$R_{t,3} = |a_{t,lc}| \times \min\left[0, 1 - \left(\frac{s^*}{\Delta p_{t+1,f}}\right)^2\right] \qquad \text{[Equation 6]}$$

Here, $R_{t,3}$ represents the unsafe following distance penalty term, which is the external reward, $\Delta p_{t+1,f}$ represents a relative distance from the following vehicle on the same lane after changing lanes, $s^*$ represents a safety distance from the following vehicle on the same lane, and $|a_{t,lc}|$ represents whether the target driving vehicle performs the lane change.

$R_{t,3}$ represents a penalty term applied only when the lane change is performed, and the reward determination unit 130 determines a penalty when a lane change behavior of the target driving vehicle violates the safety distance from the following vehicle on the same lane to weaken a dangerous behavior of the target driving vehicle.

Further, an infeasible behavior penalty term may be calculated by the sum of an infeasible acceleration control term and an infeasible lane change term.

Specifically, the infeasible acceleration control term is calculated by Equation 7 below.

$$\text{fail}_{acc} = -\left|\frac{v_{t+1,N} - (v_{t,N} + a_{t,acc} \cdot t_s)}{t_s}\right| \qquad \text{[Equation 7]}$$

Here, $\text{fail}_{acc}$ represents the infeasible acceleration control term, $v_{t,N}$ represents an absolute speed of the target driving vehicle, $a_{t,acc}$ represents a selected acceleration between a minimum acceleration and a maximum acceleration, and $t_s$ represents a time interval between t and t+1.

$\text{fail}_{acc}$ is generated when the selected acceleration $a_{t,acc}$ is not properly reflected to the speed of the target driving vehicle, and the acceleration control is selected as a continuous value between the minimum acceleration and the maximum acceleration. The selected acceleration value is used to determine the speed of a next time in addition to a current speed.

Further, the infeasible lane change term is calculated by Equation 8 below.

$$\text{fail}_{lc} = \begin{cases} 0 & k_{t+1,N} - k_{t,N} = a_{t,lc} \\ -1 & k_{t+1,N} - k_{t,N} \neq a_{t,lc} \end{cases} \qquad \text{[Equation 8]}$$

Here, $fail_{lc}$ represents the infeasible lane change term, $k_{t,N}$ represents a lane number where the target driving vehicle is positioned at time t, and $a_{t,lc}$ represents a selected lane change direction.

$fail_{lc}$ is assigned when the target driving vehicle does not perform a behavior in the lane change direction, and the direction of the lane change is determined as one value of −1, 0, and 1. Here, −1 represents a lane change to the right, 1 represents the lane change to the left, and 0 represents a lane maintenance.

As such, according to an exemplary embodiment of the present disclosure, in the method and the apparatus for determining a vehicle behavior, the target driving vehicle may drive close to the target speed using the reward function including various reward terms, but also minimize the speed decrease in the congestion section through by changing the lane.

The model training unit 140 trains the decision making model through the reward of the target driving vehicle determined using the surrounding information and observation information. The surrounding information and the observation information may be collected and updated in real time, and the decision making model may be repeatedly trained according to the updated surrounding information and observation information, and trained to make a best behavior determination.

Figure 5:
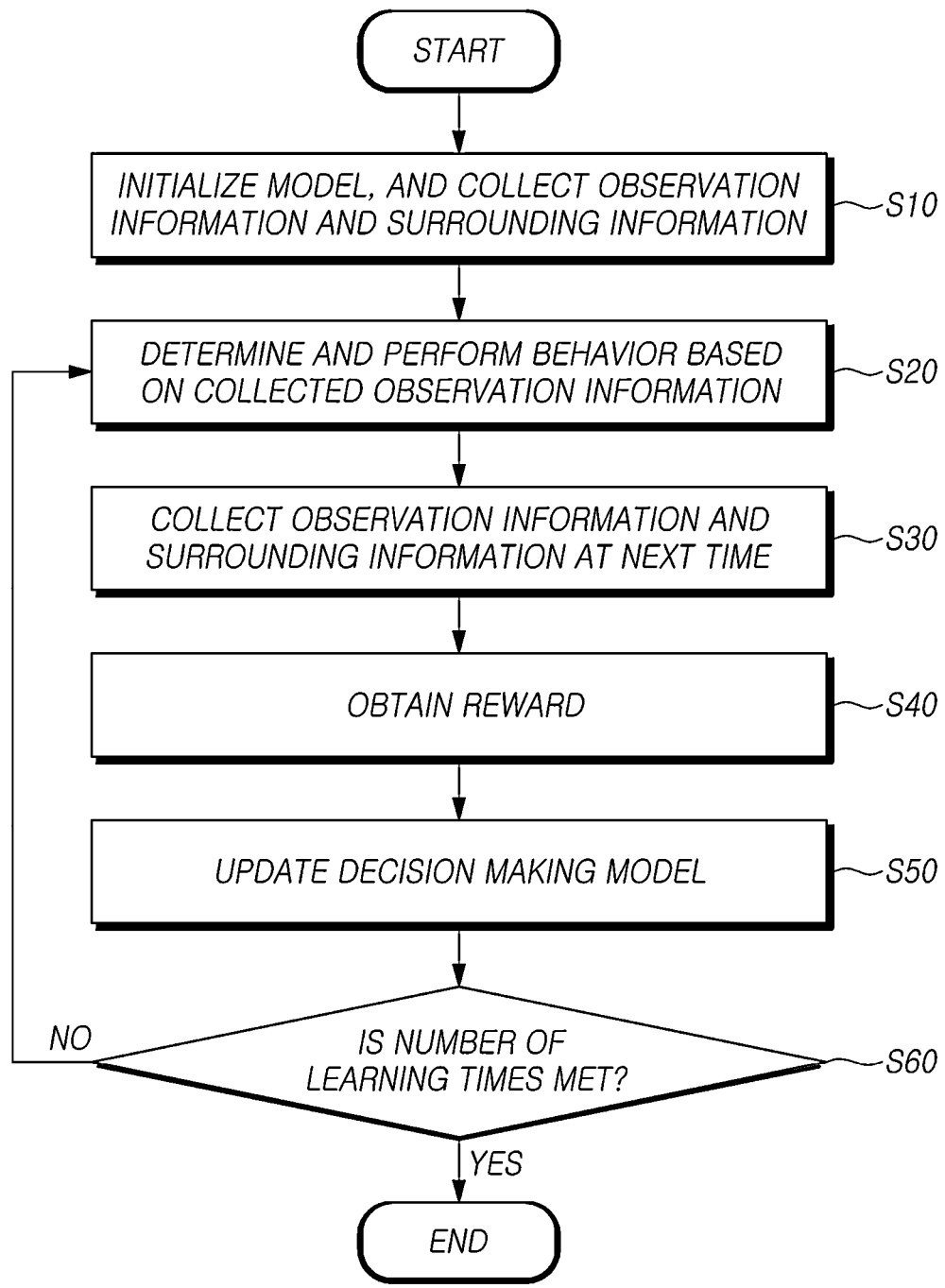
FIG. 5 is a flowchart illustrating a training flow of a decision making model according to an exemplary embodiment of the present disclosure.

FIG. 5 is a flowchart illustrating a training flow of a decision making model according to an exemplary embodiment of the present disclosure.

The model training unit 140 may train the decision making model through deep reinforcement learning. First, when the decision making model is initialized, the information collection unit 110 collects initial observation information and surrounding information (S10).

Thereafter, the behavior determination unit 150 determines the behavior based on the collected observation information, and when the target driving vehicle performs the determined behavior (S20), the information collection unit 110 collects observation information and surrounding information at a next time (S30).

Next, the reward determination unit 130 determines the reward through the reward function using the collected observation information and surrounding information (S40), and the model training unit 140 updates and trains the decision making model (S50).

Such training may be repeated until the predetermined number of training times is met (S60), and when the number of training times is not met, the collection of the observation information and the surrounding information is repeated, and when the predetermined number of training times is reached, the training ends.

The behavior determination unit 150 determines the behavior at of the target driving vehicle by inputting the observation information into the trained decision making model. Specifically, as the behavior of the target driving vehicle, both behaviors of the acceleration control and the lane change are performed.

As such, since the apparatus for determining a vehicle behavior according to an exemplary embodiment of the present disclosure determines the behavior of the target driving vehicle based on only the observation, the apparatus may determine the behavior stably regardless of whether an RSU communication operation is performed.

Further, the method and the apparatus for determining a vehicle behavior according to an exemplary embodiment of the present disclosure consider the lane change in addition to the acceleration control to determine an exact behavior of the target driving vehicle.

Figures 6A, 6B:
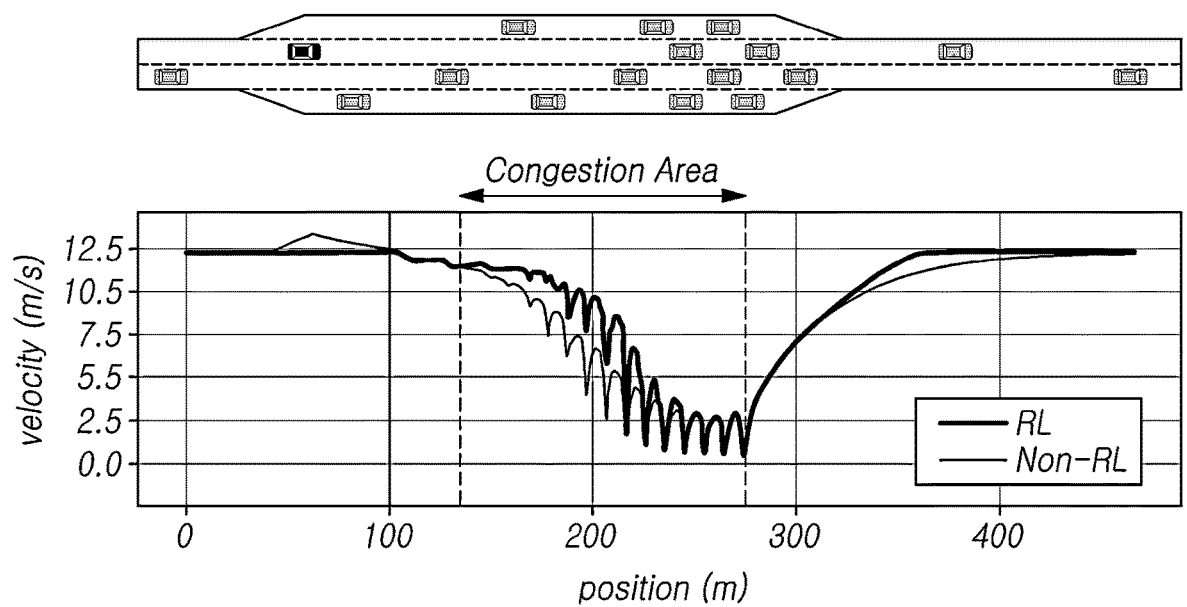
FIG. 6A and FIG. 6B are diagrams for describing an effect of an apparatus for determining a vehicle behavior according to the present disclosure.

FIG. 6A and FIG. 6B are diagrams for describing an effect of an apparatus for determining a vehicle behavior according to the present disclosure. The target driving vehicle is indicated as a RL vehicle as a vehicle trained as the decision making model through the deep reinforcement learning. And, Other vehicle that has not been trained as the decision making model through the deep reinforcement learning, is indicated as a Non-RL vehicle Referring to FIG. 6A, it may be seen that the speed of the RL vehicle is higher than an average speed of the Non-RL vehicle over all sections, and the speed of the RL vehicle is also higher than the Non-RL vehicle in the bottleneck section which is a congestion area.

Further, referring to FIG. 6B, the average speed of the RL vehicle RL in all sections was 6.31 m/s, which showed a speed enhancement of 9.4% compared to 5.77 m/s which is the average speed of the Non-RL vehicle.

In addition, the average vehicle of the RL vehicle in the bottleneck section was 5.32 m/s, which showed a speed enhancement of 11.1% compared to 4.79 m/s which is the average speed of the Non-RL vehicle in the bottleneck section. This shows that RL vehicle may maintain a high speed in the congestion area and all sections of the road.

Figure 7:
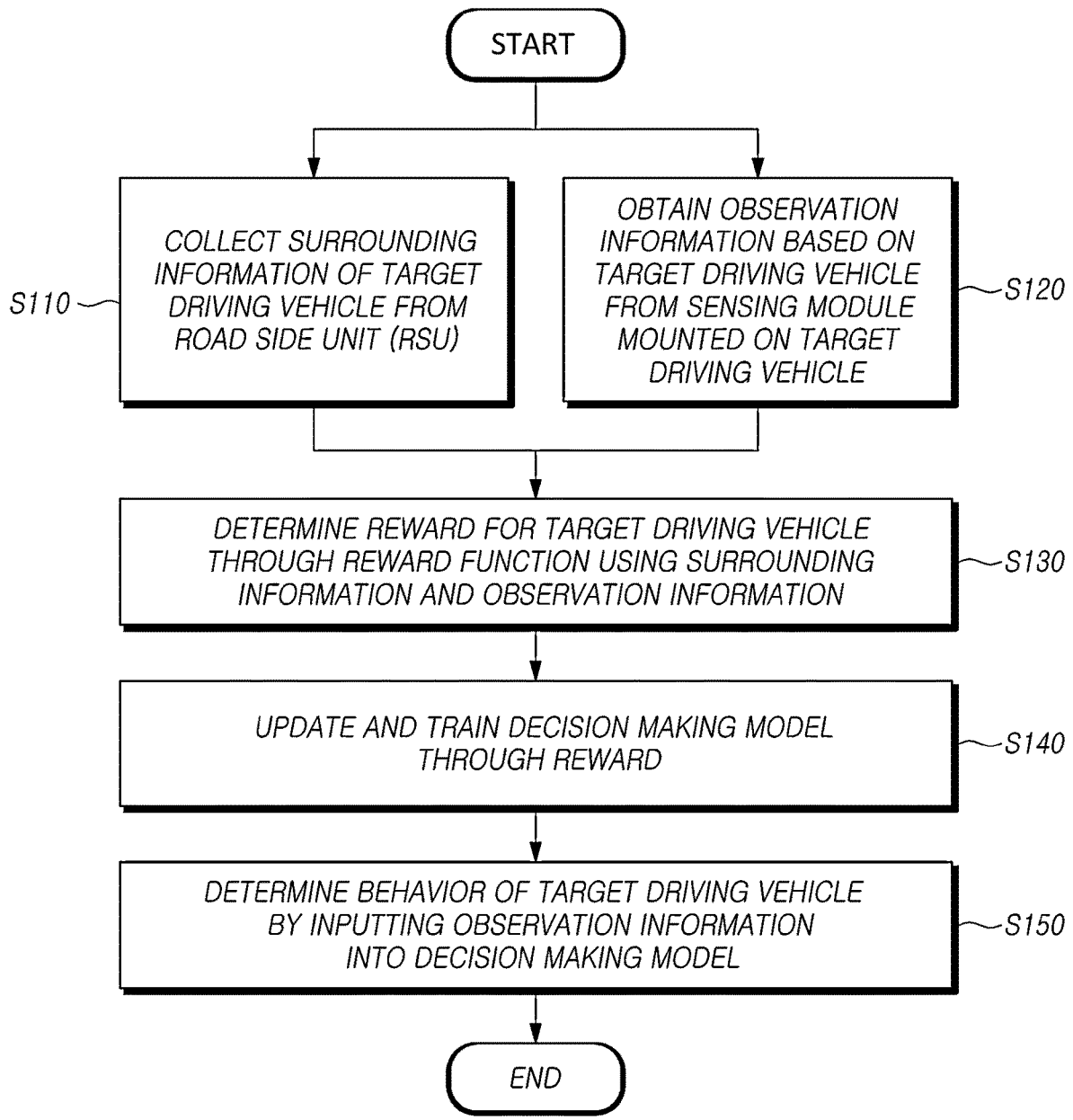
FIG. 7 is a flowchart of a method for determining a vehicle behavior according to an exemplary embodiment of the present disclosure.

FIG. 7 is a flowchart of a method for determining a vehicle behavior according to an exemplary embodiment of the present disclosure.

Referring to the figure, the vehicle behavior determining apparatus collects the surrounding information of the target driving vehicle from the RSU (S110), and at the same time, the vehicle observation unit obtains the observation information based on the target driving vehicle from the sensing module mounted on the target driving vehicle (S120). Thereafter, the reward determination unit determines the reward of the target driving vehicle through the reward function using the surrounding information and the observation information (S130).

Next, when the model training unit updates and trains the decision making model through the reward (S140), the behavior determination unit determines the behavior of the target driving vehicle by inputting the observation information into the decision making model (S150).

As described above, the present disclosure is described with reference to the exemplified drawing, but the present disclosure is not limited by the exemplary embodiments and drawings disclosed in this specification, and it is apparent that various modifications may be made by those skilled in the art without the scope of the technical spirit of the present disclosure. In addition, it is natural that even though an action effect according to the configuration of the present disclosure is explicitly disclosed and described while describing the exemplary embodiments of the present disclosure, predictable effects should also be accepted by the corresponding configuration.

The exemplary embodiment according to the present invention, e.g., the term "unit", may be implemented by various means, for example, a hardware, a firmware, a software, and a combination thereof. When the exemplary embodiment is implemented by the hardware, one exemplary embodiment of the present invention may be implemented by one or more of application specific integrated circuits (ASICs), digital signal processors (DSPs), digital signal processing devices (DSPDs), programmable logic devices (PLDs), field programmable gate arrays (FPGAs), processes, controllers, microcontrollers, or microprocessors.

When the exemplary embodiment is implemented by the firmware or the software, the exemplary embodiment of the present invention may be implemented by a module, a procedure, or a function which performs a function or operations described above. The software code is stored in the memory to be driven by the processor. The memory is located inside or outside the processor and exchanges data with the processor, by known unit.

What is claimed is:

1. An apparatus for determining a vehicle behavior, the apparatus comprising:
an information collection processor configured to collect surrounding information of a target driving vehicle from a road side unit (RSU), in real time;
a vehicle observation processor configured to obtain observation information, in real time, based on the target driving vehicle from a sensing module mounted on the target driving vehicle;
a reward determination processor configured to determine a reward for the target driving vehicle through a reward function which uses the surrounding information and the observation information;
a model training processor configured to update and train a decision making model through deep reinforcement learning using the reward,
wherein the model training processor is configured to:
initialize the decision making model,
repeatedly update and train the decision making model through the reward based on the surrounding information and the observation information until a predetermined number of training times is met, and
end training when the predetermined number of training times is reached; and
a behavior determination processor configured to determine a behavior of the target driving vehicle by inputting the observation information into the decision making model, wherein the decision making model outputs acceleration control and lane change as the behavior of the target driving vehicle,
wherein the reward function is expressed by following equation:

$$R_t = \eta_1 R_{t,1} + \eta_2 R_{t,2} + \eta_3 R_{t,3} + \eta_4 R_{t,4}$$

wherein $R_t$ represents a total reward, $R_{t,1}$ represents a target speed compliance reward/penalty term, $R_{t,2}$ represents a successful lane change reward/penalty term, $R_{t,3}$ represents an unsafe following distance penalty term, $R_{t,4}$ represents an infeasible behavior penalty term, and $\eta$ is any positive real number including 0 representing a weight of each reward term,
wherein the target speed compliance reward/penalty term is calculated by following equation:

$$R_{t,1} = \begin{cases} \frac{v_{t+1,N}}{v^*} & v_{t+1,N} \leq v^* \\ \frac{v_{limit} - v_{t+1,N}}{v_{limit} - v^*} & v_{t+1,N} > v^* \end{cases}$$

wherein $R_{t,1}$ represents the target speed compliance reward/penalty term, which is an internal reward, $v_{1,N}$ represents an absolute speed of the target driving vehicle at time t+1, $v^*$ represents the target speed of the target driving vehicle, and $v_{limit}$ represents a speed limit, respectively.

2. The apparatus for determining a vehicle behavior of claim 1, wherein the reward determination processor includes an internal reward determination processor configured to determine an internal reward using the observation information and an external reward determination processor configured to determine an external reward using the surrounding information.

3. The apparatus for determining a vehicle behavior of claim 1, wherein the successful lane change reward/penalty term is calculated by:

$$R_{t,2} = |a_{t,lc}|(\Delta p_{t+1,l} - \Delta p_{t,l} - \delta_{lc})$$

wherein $R_{t,2}$ represents the successful lane change reward/penalty term, which is an external reward, $\Delta p_{t+1,l}$ represents a relative distance from following vehicle on the same lane after changing lanes, $\Delta p_{t,l}$ represents a relative distance from leading vehicle on the same lane before the lane change, $\delta_{lc}$ represents a threshold determining successful lane change, respectively, and $|a_{t,lc}|$ represents whether the target driving vehicle performs the lane change.

4. The apparatus for determining a vehicle behavior of claim 1, wherein the unsafe following distance penalty term is calculated by following equation:

$$R_{t,3} = |a_{t,lc}| \times \min\left[0, 1 - \left(\frac{s^*}{\Delta p_{t+1,f}}\right)^2\right]$$

wherein $R_{t,3}$ represents the unsafe following distance penalty term, which is an external reward, $\Delta p_{t+1,f}$ represents a relative distance from following vehicle on the same lane after changing lanes, $s^*$ represents a safety distance from the following vehicle on the same lane, and $|a_{t,lc}|$ represents whether the target driving vehicle performs the lane change.

5. The apparatus for determining a vehicle behavior of claim 1, wherein the infeasible behavior penalty term is calculated using at least one of an infeasible acceleration control term and an infeasible lane change term.

6. The apparatus for determining a vehicle behavior of claim 1, wherein the surrounding information includes speed and location information of a leading/following vehicle positioned on the same lane with the target driving vehicle.

7. The apparatus for determining a vehicle behavior of claim 1, wherein the observation information includes at least one of, based on the target driving vehicle, a relative speed of a leading/following vehicle for each lane, a relative distance from the leading/following vehicle for each lane, a vehicle density for each front lane, a number of lanes on the road after an effective observation distance, an absolute speed of the target driving vehicle, an absolute location of the target driving vehicle, a lane number where the target driving vehicle is positioned, and a total number of lanes on the road where the target driving vehicle is positioned.

8. A method for determining a vehicle behavior for bottleneck congestion control in a bottleneck section using an apparatus for determining a vehicle behavior, the method comprising:

collecting, by an information collection processor, surrounding information of a target driving vehicle from a road side unit (RSU), in real time;

obtaining, by a vehicle observation processor, observation information, in real time, based on the target driving vehicle from a sensing module mounted on the target driving vehicle;

determining, by a reward determination processor, a reward of the target driving vehicle through a reward function using the surrounding information and the observation information;

updating and training, by a model training processor, a decision making model through deep reinforcement learning using the reward, wherein the updating and training comprises:
  initializing the decision making model,
  repeatedly updating and training the decision making model through the reward based on the surrounding information and the observation information until a predetermined number of training times is met, and
  ending training when the predetermined number of training times is reached; and determining, by a behavior determination processor, a behavior of the target driving vehicle by inputting the observation information into the decision making model, wherein the decision making model outputs acceleration control and lane change as the behavior of the target driving vehicle, wherein the reward function is expressed by following equation:

$$R_t = \eta_1 R_{t,1} + \eta_2 R_{t,2} + \eta_3 R_{t,3} + \eta_4 R_{t,4}$$

wherein $R_t$ represents a total reward, $R_{t,1}$ represents a target speed compliance reward/penalty term, $R_{t,2}$ represents a successful lane change reward/penalty term, $R_{t,3}$ represents an unsafe following distance penalty term, $R_{t,4}$ represents an infeasible behavior penalty term, and $\eta$ is any positive real number including 0 representing a weight of each reward term, wherein the target speed compliance reward/penalty term is calculated by following equation:

$$R_{t,1} = \begin{cases} \dfrac{v_{t+1,N}}{v^*} & v_{t+1,N} \leq v^* \\ \dfrac{v_{limit} - v_{t+1,N}}{v_{limit} - v^*} & v_{t+1,N} > v^* \end{cases}$$

wherein $R_{t,1}$ represents the target speed compliance reward/penalty term, which is an internal reward, $v_{t+1,N}$ represents an absolute speed of the target driving vehicle at time t+1, $v^*$ represents the target speed of the target driving vehicle, and $v_{limit}$ represents a speed limit, respectively.

9. The method for determining a vehicle behavior for bottleneck congestion control in a bottleneck section using an apparatus for determining a vehicle behavior of claim 8, wherein the reward determination processor includes an internal reward determination processor configured to determine an internal reward using the observation information and an external reward determination processor configured to determine an external reward using the surrounding information.

10. The method for determining a vehicle behavior for bottleneck congestion control in a bottleneck section using an apparatus for determining a vehicle behavior of claim 8, wherein the successful lane change reward/penalty term is calculated by following equation:

$$R_{t,2} = |a_{t,lc}|(\Delta p_{t+1,l} - \Delta p_{t,l} - \delta_{lc})$$

wherein $R_{t,2}$ represents the successful lane change reward/penalty term, which is an external reward, $\Delta p_{t+1,l}$ represents a relative distance from following vehicle on the same lane after changing lanes, $\Delta p_{t,l}$ represents a relative distance from leading vehicle on the same lane before the lane change, $\delta_{lc}$ represents a threshold determining successful lane change, respectively, and $|a_{t,lc}|$ represents whether the target driving vehicle performs the lane change.

11. The method for determining a vehicle behavior for bottleneck congestion control in a bottleneck section using an apparatus for determining a vehicle behavior of claim 8, wherein the unsafe following distance penalty term is calculated by following equation:

$$R_{t,3} = |a_{t,lc}| \times \min\left[0, 1 - \left(\dfrac{s^*}{\Delta p_{t+1,f}}\right)^2\right]$$

wherein $R_{t,3}$ represents the unsafe following distance penalty term, which is an external reward, $\Delta p_{t+1,f}$ represents a relative distance from following vehicle on the same lane after changing lanes, $s^*$ represents a safety distance from the following vehicle on the same lane, and $|a_{t,lc}|$ represents whether the target driving vehicle performs the lane change.

12. The method for determining a vehicle behavior for bottleneck congestion control in a bottleneck section using an apparatus for determining a vehicle behavior of claim 8, wherein the infeasible behavior penalty term is calculated using at least one of an infeasible acceleration control term and an infeasible lane change term.

13. The method for determining a vehicle behavior for bottleneck congestion control in a bottleneck section using an apparatus for determining a vehicle behavior of claim 8, wherein the surrounding information includes speed and location information of a leading/following vehicle positioned on the same lane with the target driving vehicle.

14. The method for determining a vehicle behavior for bottleneck congestion control in a bottleneck section using an apparatus for determining a vehicle behavior of claim 8, wherein the observation information includes at least one of, based on the target driving vehicle, a relative speed of a leading/following vehicle for each lane, a relative distance from the leading/following vehicle for each lane, a vehicle density for each front lane, a number of lanes on the road after an effective observation distance, an absolute speed of the target driving vehicle, an absolute location of the target driving vehicle, a lane number where the target driving vehicle is positioned, and a total number of lanes on the road where the target driving vehicle is positioned.

15. An apparatus for determining a vehicle behavior, the apparatus comprising:
  an information collection processor configured to collect surrounding information of a target driving vehicle from a road side unit (RSU), in real time;

a vehicle observation processor configured to obtain observation information, in real time, based on the target driving vehicle from a sensing module mounted on the target driving vehicle;

a reward determination processor configured to determine a reward for the target driving vehicle through a reward function which uses the surrounding information and the observation information;

a model training processor configured to update and train a decision making model through deep reinforcement learning using the reward, wherein the model training processor is further configured to:
  initialize the decision making model,
  repeatedly update and train the decision making model through the reward based on the surrounding information and the observation information until a predetermined number of training times is met, and
  end training when the predetermined number of training times is reached; and a behavior determination processor configured to determine a behavior of the target driving vehicle by inputting the observation information into the decision making model, wherein the decision making model outputs acceleration control and lane change as the behavior of the target driving vehicle, wherein the reward function is expressed by following equation:

$$R_t = \eta_1 R_{t,1} + \eta_2 R_{t,2} + \eta_3 R_{t,3} + \eta_4 R_{t,4}$$

wherein $R_t$ represents a total reward, $R_{t,1}$ represents a target speed compliance reward/penalty term, $R_{t,2}$ represents a successful lane change reward/penalty term, $R_{t,3}$ represents an unsafe following distance penalty term, $R_{t,4}$ represents an infeasible behavior penalty term, and is any positive real number including 0 representing a weight of each reward term, wherein the successful lane change reward/penalty term is calculated by following equation:

$$R_{t,2} = |\alpha_{t,lc}|(\Delta p_{t+1,l} - \Delta p_{t,l} - \delta_{lc})$$

wherein $R_{t,2}$ represents the successful lane change reward/penalty term, which is an external reward, $\Delta p_{t+1,l}$ represents a relative distance from following vehicle on the same lane after changing lanes, $\Delta p_{t,l}$ represents a relative distance from leading vehicle on the same lane before the lane change, $\delta_{lc}$ represents a threshold determining successful lane change, respectively, and $|a_{t,lc}|$ represents whether the target driving vehicle performs the lane change.

16. The apparatus for determining a vehicle behavior of claim 15, wherein the reward determination processor includes an internal reward determination processor determining an internal reward using the observation information and an external reward determination processor determining an external reward using the surrounding information.

17. The apparatus for determining a vehicle behavior of claim 15, wherein the unsafe following distance penalty term is calculated by following equation:

$$R_{t,3} = |a_{t,lc}| \times \min\left[0, 1 - \left(\frac{s^*}{\Delta p_{t+1,f}}\right)^2\right]$$

wherein $R_{t,3}$ represents the unsafe following distance penalty term, which is the external reward, $\Delta p_{t+1,f}$ represents a relative distance from following vehicle on the same lane after changing lanes, $s^*$ represents a safety distance from the following vehicle on the same lane, and $|a_{t,lc}|$ represents whether the target driving vehicle performs the lane change.

18. The apparatus for determining a vehicle behavior of claim 15, wherein the infeasible behavior penalty term is calculated using at least one of an infeasible acceleration control term and an infeasible lane change term.

19. The apparatus for determining a vehicle behavior of claim 15, wherein the surrounding information includes speed and location information of a leading/following vehicle positioned on the same lane with the target driving vehicle.

20. The apparatus for determining a vehicle behavior of claim 15, wherein the observation information includes at least one of, based on the target driving vehicle, a relative speed of a leading/following vehicle for each lane, a relative distance from the leading/following vehicle for each lane, a vehicle density for each front lane, a number of lanes on the road after an effective observation distance, an absolute speed of the target driving vehicle, an absolute location of the target driving vehicle, a lane number where the target driving vehicle is positioned, and a total number of lanes on the road where the target driving vehicle is positioned.

* * * * *